United States Patent
Hamadou (10) Patent No.: US 12,088,967 B2
(45) Date of Patent: Sep. 10, 2024

(54) CONSTRUCTION OF ENVIRONMENT VIEWS FROM SELECTIVELY DETERMINED ENVIRONMENT IMAGES

(71) Applicant: Siemens Industry Software Inc., Plano, TX (US)

(72) Inventor: Mehdi Hamadou, Erlangen (DE)

(73) Assignee: Siemens Industry Software Inc., Plano, TX (US)

( * ) Notice: Subject to any disclaimer, the term of this patent is extended or adjusted under 35 U.S.C. 154(b) by 416 days.

(21) Appl. No.: 17/398,179

(22) Filed: Aug. 10, 2021

(65) Prior Publication Data

US 2023/0051775 A1    Feb. 16, 2023

(51) Int. Cl.
*H04N 7/18*      (2006.01)
*G06V 10/20*     (2022.01)
*G06V 20/20*     (2022.01)
*H04N 5/262*     (2006.01)

(52) U.S. Cl.
CPC ............. *H04N 7/183* (2013.01); *G06V 10/20* (2022.01); *G06V 20/20* (2022.01); *H04N 5/2628* (2013.01)

(58) Field of Classification Search
CPC ................. H04N 7/183; H04N 5/2628; H04N 21/21805; H04N 21/234; H04N 21/4223; H04N 21/44008; H04N 21/816; H04N 21/8547; G06V 10/20; G06V 20/20; G06T 15/20; G06T 2210/04; G06T 2210/08; G06T 19/003
See application file for complete search history.

(56) References Cited

U.S. PATENT DOCUMENTS

| | | | |
|---|---|---|---|
| 11,128,794 B2* | 9/2021 | Merati | G06T 11/60 |
| 11,145,085 B2* | 10/2021 | Huh | H04N 5/7408 |
| 11,163,813 B2* | 11/2021 | Leong | G06F 16/587 |
| 11,167,207 B2* | 11/2021 | LaHorgue | A63F 13/30 |
| 11,386,151 B2* | 7/2022 | Fleischman | G06F 18/22 |
| 2019/0005719 A1* | 1/2019 | Fleischman | G06T 7/75 |
| 2020/0027267 A1* | 1/2020 | Fleischman | G06T 7/579 |
| 2020/0314356 A1* | 10/2020 | Storer | G06T 7/194 |
| 2020/0333772 A1* | 10/2020 | Srivastava | G05B 13/0265 |

(Continued)

OTHER PUBLICATIONS

M. Cohen, N. A. Bolhassan and O. N. N. Fernando, "A Multiuser Multiperspective Stereographic QTVR Browser Complemented by Java3D Visualizer and Emulator," in Presence, vol. 16, No. 4, pp. 414-438, Aug. 1, 2007, doi: 10.1162/pres.16.4.414. (Year: 2007).*

(Continued)

*Primary Examiner* — Andrae S Allison (57) ABSTRACT

A computing system may include a client device and a server. The client device may be configured to access a stream of image frames that depict an environment, determine, from the stream of image frames, environment images that satisfy selection criteria, and transmit the environment images to the server. The server may be configured to receive the environment images from the client device, construct a spatial view of the environment based on position data included with the environment images, and navigate the spatial view, including by receiving a movement direction and progressing from a current environment image depicted for the spatial view to a next environment image based on the movement direction.

13 Claims, 6 Drawing Sheets

(56) References Cited

U.S. PATENT DOCUMENTS

2021/0029183 A1* 1/2021 Kato ............... H04L 65/752
2021/0243388 A1* 8/2021 Storer ................ G06T 11/60
2022/0292768 A1* 9/2022 Fleischman .......... H04N 13/204

OTHER PUBLICATIONS

Venema Anton: "Selective Forwarding—Scaling Beyond Simple Peer Connections", Frozen Mountain White Paper Series, Oct. 1, 2017, XP93011664, Retrieved from Internet: URL : https : //www.frozenmountain-sfu-selective-forwarding-whitepaper.pdf.

* cited by examiner

CONSTRUCTION OF ENVIRONMENT VIEWS FROM SELECTIVELY DETERMINED ENVIRONMENT IMAGES

BACKGROUND

Computer systems can be used to create, use, and manage data for products and other items. Computer-aided technology (CAx) systems, for instance, may be used to aid in the design, analysis, simulation, or manufacture of products. Examples of CAx systems include computer-aided design (CAD) systems, computer-aided engineering (CAE) systems, visualization and computer-aided manufacturing (CAM) systems, manufacturing operations management (MOM) systems, product data management (PDM) systems, product lifecycle management (PLM) systems, and more. These CAx systems may include components (e.g., CAx applications) that facilitate the design, simulated testing, and management of product structures and product manufacturing.

BRIEF DESCRIPTION OF THE DRAWINGS

Certain examples are described in the following detailed description and in reference to the drawings.

DETAILED DESCRIPTION

With technological advances, modern industrial environments are becoming increasingly complex in design, layout, and operation. For example, modern assembly lines and manufacturing plants may include complex robotic machinery and other factory technology that can support semi or fully automated construction of highly complex assemblies ranging from home appliances, to semiconductor assemblies, to automotive vehicles, and near countless other types of products. The maintenance of complex industrial environments can be challenging, and in-depth knowledge of every factory element that can be included in modern industrial environments is not practically feasible. As such, maintenance of factories and other manufacturing environments is often outsourced to external service providers who specialize in the maintenance or servicing of specific physical hardware. Service appointments to repair or maintain facility resources may take the form of on-site visitations of a machinery expert, which can incur time and travel costs and limit the efficiency of such maintenance programs.

Alternatively, service hotlines can provide telephonic mechanisms to verbally describe a maintenance issue, but verbal descriptions alone may be incomplete in explaining, diagnosing, or resolving malfunctioning industrial systems. Remote conferencing may provide a mechanism for a serviceman or expert to digitally view an industrial environment and discuss service requirements with an on-site operator. However, general videoconference technology may provide an inefficient mechanism by which a remote expert or maintenance person can assess a given environment and provide necessary feedback. For example, indiscriminate video transmission from a client device physically located on a factory floor may consume significant network bandwidth and computing power in order to properly compress and transmit video streams. Constant video streaming may also drain battery resources of client devices of local operators used to provide a digital view of the industrial environment to remote maintenance experts.

Moreover, operator-driven video streams are necessarily dependent on the guiding of the local operator to move a local client device to capture the necessary environment portions for the remote expert to adequately assess the environment state. Rapid hand or head movements may result in blurred images and low-quality video streams, which can decrease the efficacy of maintenance and repair efforts. As yet another drawback, teleconferencing technologies provide real-time operator-controlled views, and a remote expert is unable to rewind or look back on relevant environment sections without having the operator redirect a teleconference view to a specific location in the environment.

The disclosure herein may provide systems, methods, devices, and logic for construction of environment views from selectively determined environment images. The environment construction technology described herein may provide capabilities for selective determination of environment images from an image stream captured by client devices physically located within an environment. Instead of indiscriminately transmitting each image frame (e.g., video frame) captured by a client device, the environment construction technology described herein may apply any number of selection criteria by which to selectively determine particular environment images to transmit for processing and visualization by a remote server (e.g., accessible and used by a remote technician or expert). Selection criteria applied by a client device to determine environment images may include, as examples, a frequency criterion that can reduce overconsumption of network resources, a blur criterion that can enforce threshold image quality requirements, and/or a difference criterion that can reduce redundancy of transmitted images. Together, the selection criteria may increase the effectiveness and efficiency in capturing of environment images that depict a given physical environment. As such, the environment construction technology described herein may provide technical benefits through reduction of network latencies, reduction in network and computational resource consumption, and improved power efficiency of client devices used to communicate images of an environment for remote consideration.

Additionally or alternatively, the environment construction technology provided herein may provide various server-side environment view construction features by which spatial and temporal views of the environment may be generated from transmitted environment images. Through time stamps, pose data, position data, and orientation data that can be communicated with environment images, the environment construction technology presented herein may construct a spatial view of a given environment by which a user can navigate through to view distinct portions of the environment. This may allow a remote user to control navigation of the environment without having to expend time and network bandwidth in instructing a local operator to move a client device view to a specific location or position. Also, by sorting environment images into different temporal sets, the environment construction technology described herein may allow a remote expert to view a particular environment section over increments of time. By providing such time-based navigation, the environment construction technology provided herein may improve the ability for remote technicians to assess the state of particular environment elements and repair environment deficiencies.

These and other features and technical benefits of the environment construction technology presented herein are described in greater detail next.

Figure 1:
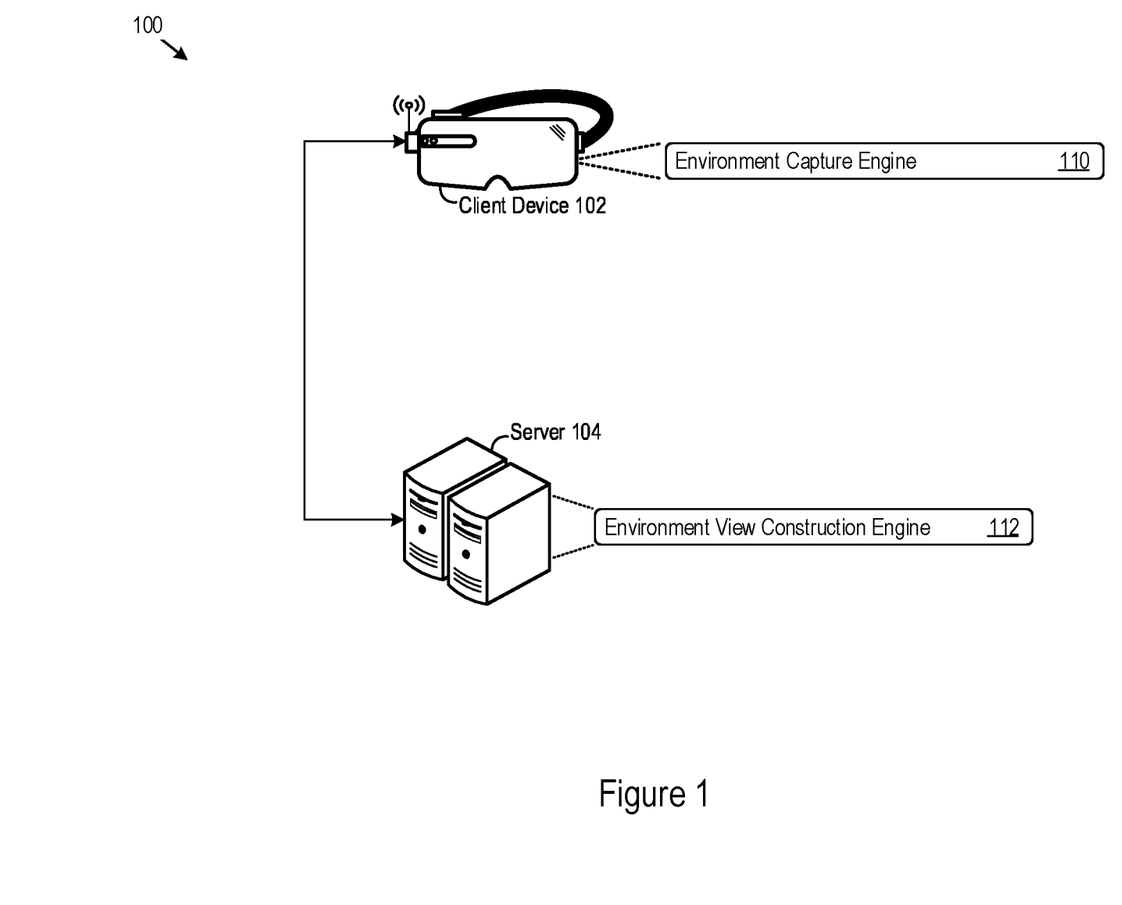
FIG. 1 shows an example of a computing system that supports construction of environment views from selectively determined environment images.

FIG. 1 shows an example of a computing system 100 that supports construction of environment views from selectively determined environment images. In the example shown in FIG. 1, the computing system 100 includes a client device 102. The client device 102 may take the form of any device that can be used to capture and transmit images of an environment. In the particular example shown in FIG. 1, the client device 102 takes the form of augment reality (AR) glasses or Smart Glasses. In other examples, the client device 102 may be a mobile phone (e.g., a smart phone), tablet, laptop computer, or any other suitable computing device. The client device 102 may be local to an environment, and thus support the capture of images of the environment (e.g., as a video stream of image frames that capture the environment). As described in greater detail herein, the client device 102 may selectively determine environment frames from the captured image stream that can then be transmitted for subsequent processing, environment viewing, and navigation.

The computing system 100 shown in FIG. 1 also includes a server 104. The server 104 may be any computing entity that receives environment images transmitted by the client device 102. As such, the server 104 may take the form of any number of computing devices, such as application servers, compute nodes, desktop or laptop computers, smart phones or other mobile devices, tablet devices, embedded controllers, and more. The server 104 may be remote from the client device 102, for example as a computing system accessed and used by a remote expert or technician in order to collaborate with a local operator of an industrial environment that uses the client device 102. As described herein, the server 104 may construct various environment views from environment images transmitted by the client device 102. Constructed environment views (e.g., spatial or temporal) may allow a remote expert to view and assess the environment or provide feedback and maintenance instructions to the local operator. Through a combination of the client device 102 and server 104, remote-based collaboration may be supported between, for example, a local operator (physically located within an industrial environment) and a remote maintenance expert. Through various environment construction features described herein, the client device 102 and the server 104 may provide such remote-based collaboration with increased efficiency and effectiveness.

As an example implementation to support any combination of the environment construction features described herein, the computing system 100 shown in FIG. 1 includes an environment capture engine 110 (implemented by the client device 102) and an environment view construction engine 112 (implemented by the server 104). The computing system 100 may implement the engines 110 and 112 (including components thereof) in various ways, for example as hardware and programming. The programming for the engines 110 and 112 may take the form of processor-executable instructions stored on non-transitory machine-readable storage mediums and the hardware for the engines 110 and 112 may include processors to execute those instructions. A processor may take the form of single processor or multi-processor systems, and in some examples, the computing system 100 implements multiple engines using the same computing system features or hardware components (e.g., a common processor or a common storage medium).

In operation, the environment capture engine 110 may access a stream of image frames captured by the client device 102 (the image frames depicting an environment), determine, from the stream of image frames, environment images that satisfy selection criteria, and transmit the environment images to the server 104. In operation, the environment view construction engine 112 may receive the environment images from the client device 102, construct a spatial view of the environment based on position data included with the environment images, and navigate the spatial view, including by receiving a movement direction and progressing from a current environment image depicted for the spatial view to a next environment image based on the movement direction.

These and other environment construction features are described in greater detail next. Many of the examples described herein are provided within the context of an industrial environment (e.g., factory environments, robotic device repair, etc.). However, the present disclosure is not so limited, and the environment construction technology presented herein may be consistently applied to physical (or digital) environments of any type.

Figure 2:
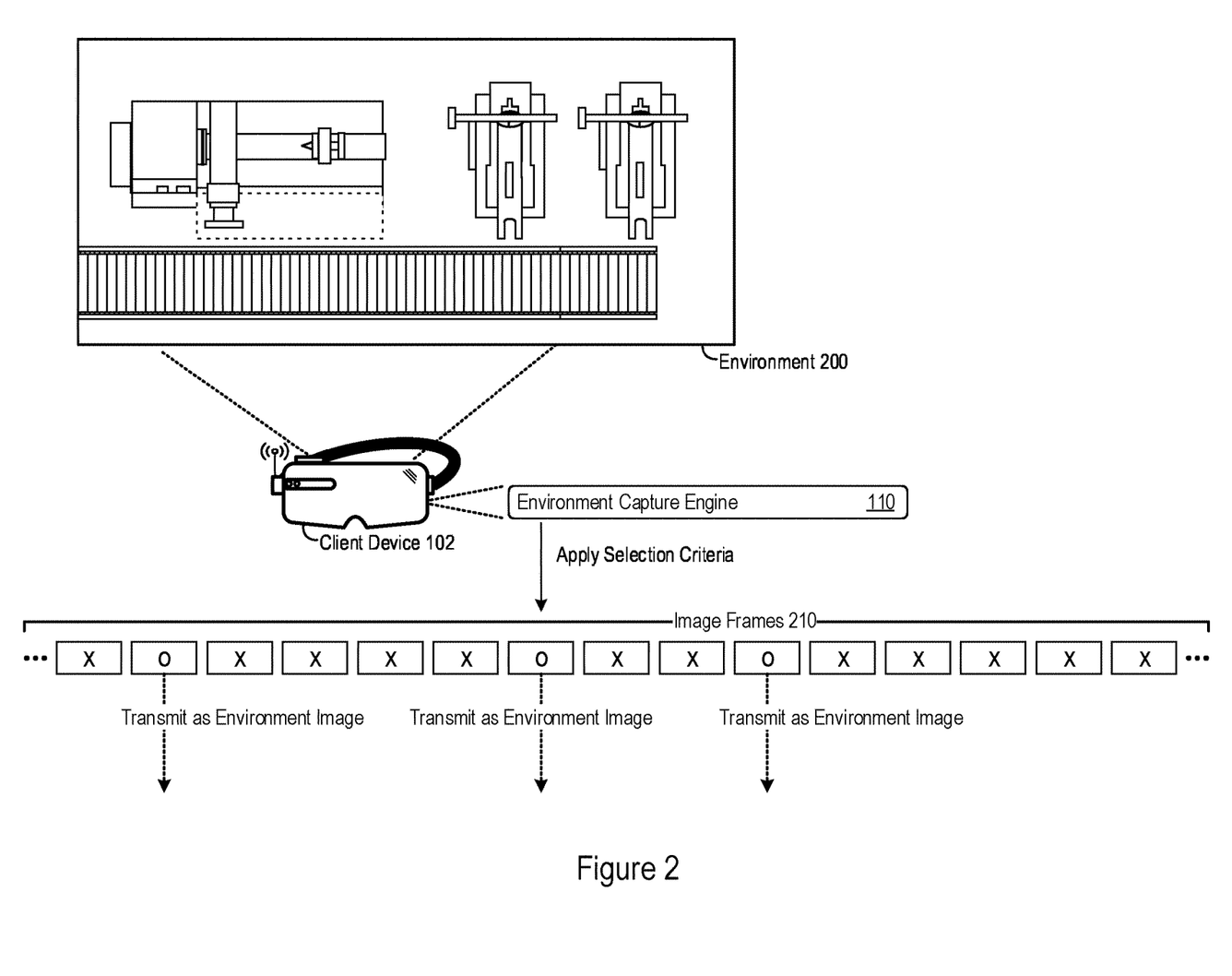
FIG. 2 shows an example determination of environment images from a stream of image frames captured by a client device.

FIG. 2 shows an example determination of environment images from a stream of image frames captured by a client device. In the example shown in FIG. 2, a client device 102 implements an environment capture engine 110. The client device 102 may be used by local personnel within an environment 200, which may be any physical (or digital) setting or location, such as a factory floor, assembly line, machinery plant, manufacturing plant, integrated circuit foundry, or any other industrial setting. A local operator may use the client device 102 to capture images of the environment 200, for example to support maintenance, repair, or servicing of machinery, robotic tools, or other elements located within the environment 200. In that regard, the client device 102 may include a digital camera or any suitable digital imaging hardware to capture images of the environment. Image capture by the client device 102 may be in the form of discrete digital images or a video stream comprised of video frames.

Instead of indiscriminately sending every captured image to a remote server as a real-time video stream to a remote technician or expert, the environment capture engine 110 may selectively determine environment images from among the image frames captured by the client device 102 that depict the environment 200. An environment image may refer to any image frames selected by the environment capture engine 110 for transmission to a remote server, and the environment capture engine 110 may selectively determine environment images from a set of candidate image frames via selection criteria. Selection criteria applied by the environment capture engine 110 may specify various conditions, thresholds, or parameters by which the environment capture engine 110 may evaluate images frames captured by the client device 102 in order to selectively determine environment images. In that regard, environment images determined by the environment capture engine 110 may comprise a subset of the candidate image frames captured by a client device 102 and determined to satisfy the selection criteria.

To illustrate through FIG. 2, the environment capture engine 110 may apply selection criteria to the image frames 210 (captured by the client device 102) that depict the environment 200. The image frames 210 may be any set of images captured by the client device 102, such as a video stream of various portions of the environment 200 that the client device 102 captures through activation and use of a digital camera of the client device 102 (e.g., by a local operator). The image frames 210 may thus be captured by the client device 102 as video data and at a rate specified by the video technology implemented or used by the client device 102 (e.g., 30 frames/second at a preconfigured video resolution). Instead of indiscriminately sending the entire video feed captured by the client device 102 (e.g., all of the image frames 210), the environment capture engine 110 may selectively determine environment images from among the image frames 210 that satisfy the selection criteria. As such, the environment capture engine 110 may determine some (but not all) of the image frames 210 as environment images to transmit to a remove server for processing and environment visualization. In the particular example shown in FIG. 2, the environment capture engine 110 selectively determines three (3) of the fifteen (15) illustrated images of the image frames 210 in FIG. 2 as environment images to transmit to a remote server for processing.

By transmitting the selectively determined environment images from the image frames 210 (and determining not to send image frames that fail the selection criteria), the environment capture engine 110 may increase the efficiency and effectiveness by which environment views of the environment 200 are constructed for evaluation, analysis, and review. Selection criteria-based determination of environment images and selective transmission of only determined environment images may reduce network consumption (especially as video streams can consume significant network bandwidth to transmit, especially for high-definition videos). Moreover, based on the specific selection criteria applied to determine the environment images, evaluation of the image frames 210 may be performed to identify and select specific image frames with reduced blur and content redundancy as determined with respect other transmitted environment frames. Various examples of selection criteria that the environment capture engine 110 may apply are described next.

As one example of selection criteria, the environment capture engine 110 may apply a frequency criterion in determination of environment images from image frames captured by a client device. The frequency criterion may set any condition or threshold that controls a rate at which the environment capture engine 110 determines (and/or transmits) environment images. For instance, the frequency criterion may limit determination and transmission of environment images at a threshold frequency, and may thus prevent selection of environment images from the image frames 210 if doing so would violate the specified threshold frequency (e.g., doing so would cause transmission of environment images at a higher/faster rate than the threshold frequency). Enforcement of such a frequency criterion may be implemented by the environment capture engine 110 in various ways.

For instance, the environment capture engine 110 may use a timer-based implementation of the frequency criterion. A timer may be set by the environment capture engine 110 based on the threshold frequency, and in such case the frequency criterion may be satisfied upon determination that a timing value set for the timer has elapsed since determination (or transmission) of a last environment image. To provide an illustrative example, a frequency criterion may set a threshold frequency of 5 frames/second, which may set a threshold or upper bound at which the environment capture engine 110 may selectively determine and transmit environment images. In this example, the environment capture engine 110 may set a timer with a timer value of 200 milliseconds (ms), which the environment capture engine 110 may compute or set based on the 5 frames/second frequency threshold. Upon determination of an environment image (that is, identification of an image frame that passes the frequency criterion and any other selection criteria), the environment capture engine 110 may reset the timer. Until the timer reaches the timer value of 200 ms, the environment capture engine 110 may determine that any candidate image frame subsequently accessed, considered, or fetched by the environment capture engine 110 does not satisfy the frequency criterion. This may be the case as any subsequently considered candidate image frame considered before the 200 ms timer has elapsed would violate the frequency threshold set by the frequency criterion. Responsive to a determination that a current candidate image frame has been accessed or fetched after the 200 ms timer value has elapsed, the environment capture engine 110 may determine that the frequency criterion is satisfied for and further apply other selection criteria in determination of environment images from the image frames 210.

As another implementation example, the environment capture engine 110 may enforce a frequency criterion based on a number of image frames fetched or considered since a last environment image was determined or transmitted. Thus, instead of a timer-based determination that the frequency threshold satisfied, the environment capture engine 110 may apply a counter-based approach, with the requisite counter value of fetched image frames for consideration based on the frequency threshold (e.g., a counter value of six (6) for a video stream of image frames 210 captured at 30 frames/second and a threshold frequency set for the frequency criterion at 5 frames/second). In such examples, the environment capture engine 110 may increment the counter for each fetched candidate image frame, and determine that the frequency criterion is satisfied when the counter value reaches or exceeds a threshold counter value computed based on the threshold frequency (e.g., >6). Upon determination of an environment image that satisfies the selection criteria, the environment capture engine 110 may reset the counter.

While some implementation examples are provided for the frequency criterion, the environment capture engine 110 may implement any suitable mechanism to control (e.g., limit) a frequency or rate at which environment frames are selectively determined from the image frames 210 captured by the client device 102. Note that in some implementations, a frequency criterion applied by the environment capture engine 110 may set an upper bound for a rate of environment image determinations. In such cases, the environment capture engine 110 may determine and transmit environment images at a rate lower than the frequency threshold (e.g., at a rate lower than a frequency threshold set to 5 frames/second). This may be the case as the environment capture engine 110 may apply other selection criteria in determination of environment images, even if the frequency criterion is satisfied. Thus, the environment capture engine 110 need not enforce a regular or fixed transmission rate for determined environment images, but may instead flexibly determine environment images from the image frames 210 that fully satisfy the selection criteria, which may result in environment view constructions with increased effectiveness and accuracy.

As another example of selection criteria, the environment capture engine 110 may apply a blur criterion in determination of environment images from image frames captured by a client device. The blur criterion may be in the form of any condition, threshold, or evaluation that is satisfied based on image quality of an image frame. Consequently, the environment capture engine 110 may perform any number of image processing algorithms on a candidate image frame to measure blurring effects present in the candidate image frame and evaluate the blur criterion. As an illustrative example, the environment capture engine 110 may perform any number of Laplacian image processing techniques to measure, detect, or identify sharp edges in a candidate image. The blur criterion may specify a threshold number of sharp edges, percentage of sharp features in the candidate image frame, or any other suitable condition that the candidate image frame must satisfy to pass the blur criterion. In some implementations, the environment capture engine 110 evaluates a candidate image frame by performing image processing on a selected subset portion of the candidate image frame (e.g., on selected pixels in the candidate image frame instead of processing all of the pixels of the candidate image frame). Doing so may reduce the computation latency and power strain on the client device 102, and thus improve the computational efficiency of the client device 102.

In some implementations, the environment capture engine 110 may evaluate the blur criterion without performing image processing on the image frames 210. Instead, the environment capture engine 110 may indirectly characterize image quality of the image frames 210 in evaluating the blur criterion. As one example, the environment capture engine 110 may access gyroscope or accelerometer data of the client device 102 as applicable to the image frames 210. Gyroscopes or accelerometers may specify measured movement data of the client device 102 (and of underlying cameras or other imaging devices) at the time of capture of the image frames 210. The blur criterion may evaluate such accelerometer data as an indirect measure of image quality. For example, the blur criterion may specify that acceleration of the client device 102 be less than a threshold acceleration or speed during capture of a candidate image frame of the image frames 210. Such threshold accelerations can be set relative to the capture frequency of a video stream, which may reflect an image capture rate of a digital camera of the client device 102.

As an illustrative example, a digital camera of the client device 102 may capture the image frames 210 of a video stream at 30 frames/second, which translates to one frame captured every 33.33 ms. For accelerator or gyroscope data that indicates the client device 102 was moving or accelerating at rate beyond a threshold rate relative to the 33.33 ms image capture rate of the client device 102, the environment capture engine 110 may indirectly determine that the captured image frame is blurred (e.g., due to the latency of the camera sensor). As such, a blur criterion applied by the environment capture engine 110 may specify a blur threshold in terms of accelerometer, gyroscope, or any other movement-based data to indirectly determine image quality and assess image quality of the image frames 210 based on a blur criterion.

As yet another example of selection criteria, the environment capture engine 110 may apply a difference criterion that specifies that content of a given environment image must differ from content of a previously determined environment image by a threshold degree. The environment capture engine 110 may implement and evaluate a difference criterion in various ways. In some implementations, the environment capture engine 110 may evaluate the difference criterion via position or orientation data of the client device 102. Positioning and orientation data may be extracted by the environment capture engine 110 for a candidate image frame and a previously determined environment image. If difference between at least one of the position data or orientation data exceeds a predetermined threshold, then the environment capture engine 110 may determine the difference criterion is satisfied.

As an illustrative example, the difference criterion may require a difference in positioning data by at least a 30 centimeter (cm) movement by the client device 102 or a difference in orientation data by at least a 15° movement by the client device 102. Such differences in positioning or orientation may provide an indirect determination that the image content of the candidate image frame and a previously determined environment image depict sufficiently distinct portions of the environment 200 (though at least some overlap can be allowed via the difference criterion). Any other suitable movement data or comparisons may be applied by the environment capture engine 110 as a proxy for content difference between a candidate image frame and a previously determined environment image.

As another implementation example, the environment capture engine 110 may perform any number of image processing techniques to evaluate a difference criterion. In some instances, the environment capture engine 110 may use motion-flow image calculations to determine overlaps between a candidate image frame of the image frames 210 and a previously determined environment image. When the determined overlap through such image processing exceeds an overlap threshold (e.g., >85% overlap or any other configurable threshold), the environment capture engine 110 may determine that the candidate image frame fails to satisfy the difference criterion. When the determined overlap does not exceed the overlap threshold, then the environment capture engine 110 may determine that the candidate image frame of the image frames 210 satisfies the difference criterion.

While some examples of selection criteria are presented herein via the frequency criterion, blur criterion, and difference criterion, the environment capture engine 110 may apply any number of additional or alternative selection criteria in selectively determining and transmitting environment images. Through such selective determinations, the environment capture engine 110 may support rate-limited selection of content-relevant images from an image stream captured by the client device 102. In doing so, the environment capture engine 110 may send a selected subset of image frames captured by client device 102, in a rate-controlled manner that does not overwhelm network bandwidth, that conserves computational power, and that reduces battery strain on the client device 102. As such, the selective determination and transmission of environment images by the environment capture engine 110 may increase the efficiency and effectiveness by which environment views are constructed in remote collaborations.

In some implementations, the environment capture engine 110 may adaptively adjust any number of thresholds set in the selection criteria. Such adaptive adjustments may be based on network characteristics or attributes of the client device 102. For instance, the environment capture engine 110 may maintain different selection criteria (or underlying thresholds) based on power levels of the client device 102. At full power (90-100% battery capacity remaining), lower power (less than 15% battery capacity remaining), or any other configurable state, the environment capture engine 110 may apply different thresholds in the selection criteria. At lower power states for the client device 102, the environment capture engine 110 may select and transmit environment images at lower frequency (e.g., 1 frame/second) as compared to other power states. Similar adjustments and adaptations may be made by the environment capture engine 110 based on network availability (e.g., based on network upload speeds, congestion measures, or any other network metric).

As yet another implementation example, the environment capture engine 110 or the environment view construction engine 112 may initiate an override period during which the environment capture engine 110 may suspend some or all of the selection criteria. For instance, the override period may be a burst of time (e.g., 10s) determined by the environment capture engine 110 to transmit the entire video stream of the environment 200 captured by the client device 102. Or, the environment capture engine 110 may suspend only the frequency criterion during the override period, but continue to apply the blur and content criteria in selective determination of environment images from the image frames 210. In any of the ways described herein, the environment construction technology provided herein may support selective determination of environment images from an image stream captured by a client device.

Any of the example adaptations to the selection criteria may be additionally or alternatively triggered or initiated by a remote server. For instance, the environment view construction engine 112 of a server 104 may specify any of the adaptations the selection criteria as described herein, e.g., in response to a request initiated by a remote technician. The environment view construction engine 110 may effectuate the adaptations to selection criteria through transmission of a selection criteria adaptation message to the client device 102, which may take the form of any communication format supported between the client device 102 and server 104. The selection criteria adaptation message may cause the environment capture engine 110 to temporarily adapt the selection criteria used to determine environment images or suspend the selection criteria altogether. In some implementations, the environment capture engine 110 may deny selection criteria adaptation requests from the environment capture engine 110, for example when relaxing or suspending the selection criteria would drain battery reserves or consume network bandwidth beyond a tolerable threshold.

Figure 3:
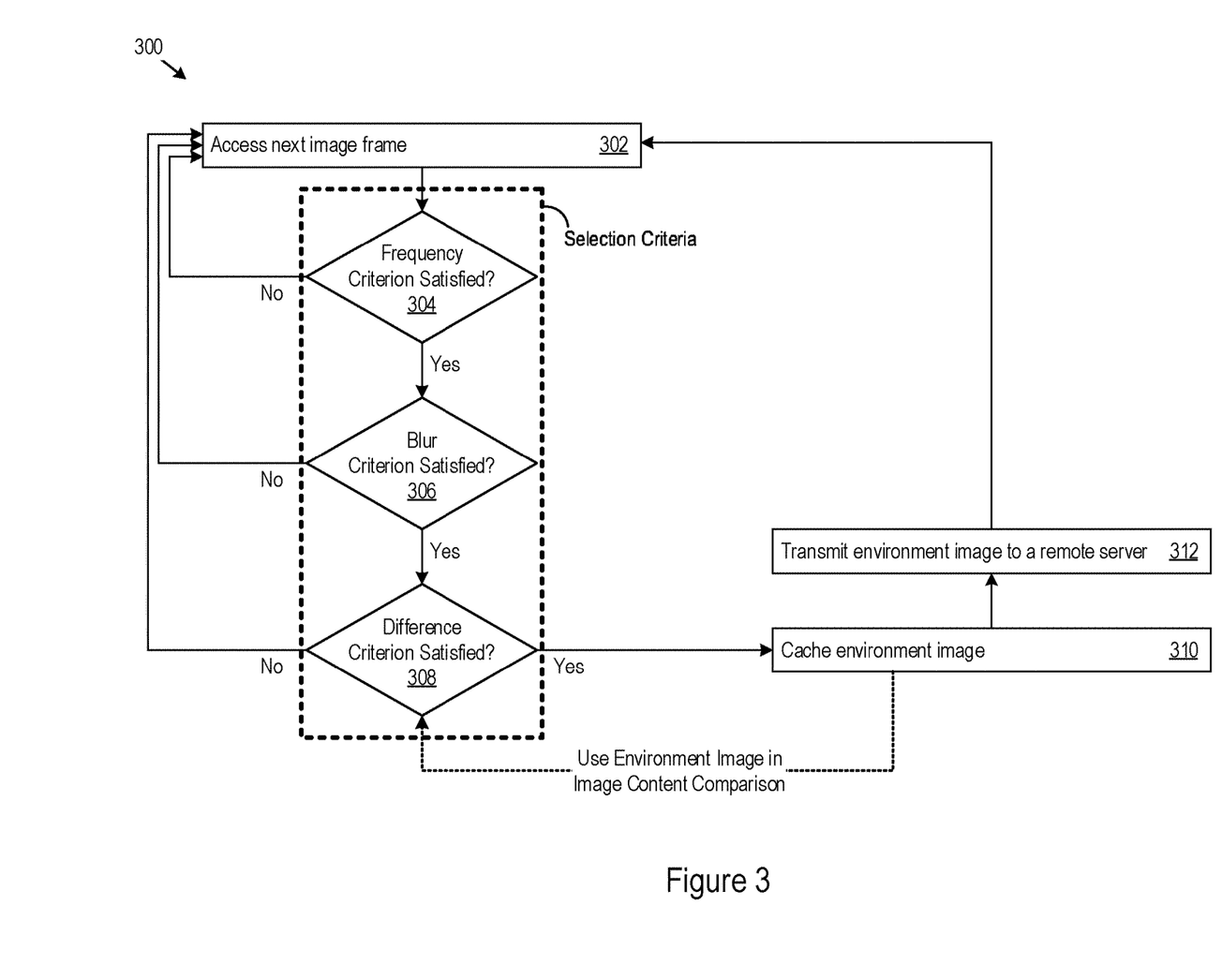
FIG. 3 shows an example of logic that a computing system may implement to determine environment images from an image stream via selection criteria.

FIG. 3 shows an example of logic 300 that a computing system may implement to determine environment images from an image stream via selection criteria. For example, the computing system 100 may implement the logic 300 as hardware, executable instructions stored on a machine-readable medium, or as a combination of both. A client device 102 of the computing system 100 may implement the logic 300 via the environment capture engine 110, through which the computing system 100 may perform or execute the logic 300 as a method to support determination and transmission of environment images. The following description of the logic 300 is provided using the environment capture engine 110 as an example. However, various other implementation options by systems are possible.

The environment capture engine 110 may evaluate a set of image frames captured by a client device that depict an environment. Evaluation of the image frames may occur on a frame-by-frame basis. Thus, in implementing the logic 300, the environment capture engine 110 may access a next image frame (302) from an image stream captured by the client device. As noted herein, the current image frame accessed for evaluation by the environment capture engine 110 may be referred to as a candidate image frame. The rate at which the environment capture engine 110 fetches image frames for evaluation may be configurable. In some cases, the environment capture engine 110 may fetch and evaluate each image frame in an image stream captured by the client device. In other cases, the environment capture engine 110 may fetch candidate image frames from the image stream at a rate lower than the capture rate of the image stream, discarding unfetched image frames in the image stream.

For a candidate image frame, the environment capture engine 110 may apply selection criteria to evaluate the candidate image frame and determine environment images. The environment capture engine 110 may apply a frequency criterion (304), which may specify determination or transmission of environment images at a rate lower than a threshold frequency. As another selection criteria, the environment capture engine 110 may apply a blur criterion (306), which may specify a threshold image quality that determined environment images must satisfy. As yet another selection criteria, the environment capture engine 110 may apply a difference criterion (308), which may specify that content of a given environment image must differ from content of a previously determined environment image by a threshold degree. The environment capture engine 110 may apply the frequency criterion, blur criterion, and difference criterion in any of the ways described herein.

Responsive to a determination that a candidate image frame fails the frequency criterion, the blur criterion, the difference criterion, or any other applied selection criteria, the environment capture engine 110 may determine that the candidate image frame fails the selection criteria and fetch a next image frame (302) from the image stream. Responsive to a determination that the candidate image frame satisfies the selection criteria, the candidate image frame may be identified as an environment frame by the environment capture engine 110. Responsive to such a determination, the environment capture engine 110 may reset a timer, counter, or any other logical element used to measure or assess the frequency criterion. In some implementations, the environment capture engine 110 may cache the determined environment image (310), and the cached environment image may be used for image content comparisons with other candidate image frames for evaluation of the difference criterion. The environment capture engine 110 may also transmit the environment image to a remote server (312) for processing and environment view construction. In some implementations, the environment capture engine 110 may compress the environment image prior to transmission to reduce network strain.

The logic 300 shown in FIG. 3 provides an illustrative example by which a client device 102 may support determination and transmission of environment images. Additional or alternative steps in the logic 300 are contemplated herein, including according to any of the various features described herein for the client device 102, environment capture engine 110, server 104, environment view construction engine 112, and any combinations thereof.

In any of the ways described herein, a client device may selectively transmit some, but not all, of a captured image stream that depicts an environment. As noted herein, the selectively determined transmitted images may be referred to as environment images. A remote server may process the environment images to construct views of the environment, for example by which a remote maintenance expert may assess the environment and provide any relevant feedback or instruction. Construction of environment views from transmitted environment images is described next.

Figure 4:
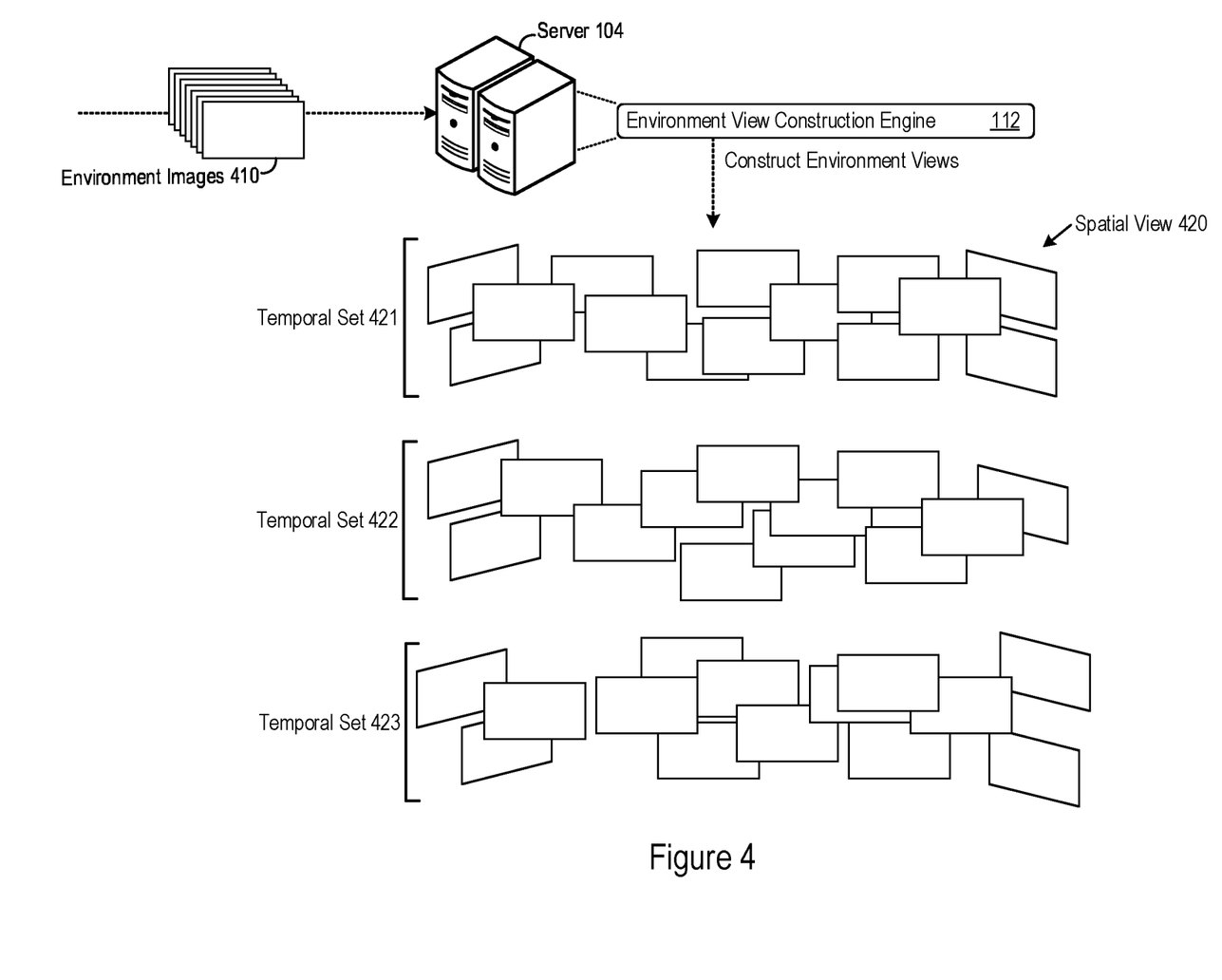
FIG. 4 shows an example construction of environment views from environment images transmitted by a client device.

FIG. 4 shows an example construction of environment views from environment images transmitted by a client device. In the example of FIG. 4, a server 104 receives environment images 410 transmitted by a client device (e.g., the client device 102). The environment images 410 may depict an environment and may be selectively determined by an environment capture engine 110 in any of the ways as described herein. The server 104 may implement or include an environment view construction engine 112 that is configured to construct environment views from the environment images 410. Environment view constructions may facilitate collaboration between a remote expert or service person and a local operator using the client device that transmitted the environment images 410.

The environment view construction engine 112 may construct environment views of an environment from the environment images 410. As one example, the environment view construction engine 112 may construct a spatial view of the environment from the environment images 410. Position and orientation data may accompany the environment images 410 received by the environment view construction engine 112, which the environment view construction engine 112 may utilize to construct spatial views. An environment view (including a spatial view) may take the form of any data structure or set of environment images that form a visual depiction of an environment (or portions thereof). Through position and orientation data for individual environment images among the environment images 410, the environment view construction engine 112 may position individual environment images 410 in corresponding positions to form a spatial view of the environment. In doing so, the environment view construction engine 112 may construct spatial views in which individual environment images may form a particular tile or portion of the environment view. As some of the environment images 410 may overlap positionally, the environment view construction engine 112 may construct spatial views of an environment in which a given position or location within the environment view can be visualized by multiple different environment images.

One example of a spatial view that the environment view construction engine 112 may construct is shown in FIG. 4 as the spatial view 420. The spatial view 420 may be comprised of multiple different environment images of the environment images 410, which together form a visualization of a particular environment. As a client device may transmit environment images individually (with different pose and orientation data), the environment view construction engine 112 may construct the spatial view 420 of an environment such that a user (e.g., remote expert) can view the environment from different angles and positions. In some implementations, the environment view construction engine 112 may visualize the spatial view 420 of an environment as individual environment images. In some implementations, the environment view construction engine 112 need not stitch together the environment images that form the spatial view 420, as image stitching may be impractical, inaccurate, or not possible through distinct environment images captured at different times, poses, and orientations. Instead, the environment view construction engine 112 may visualize the environment of a constructed spatial view 420 on an image-by-image basis. A current environment image visualized for a spatial view 420 may represent a current position, orientation, or location at which the spatial view 420 is at. Navigation to other positions in the spatial view 420 may be supported by transitioning to a different environment image that forms the spatial view 420.

The environment view construction engine 112 may support navigation of the spatial view 420 visualized for a user (e.g., remote expert) in various ways. In some instances, the environment view construction engine 112 may support navigation of the spatial view 420 through user commands, which may take the form of movement directions. Movement directions may indicate any direction by which a user specifies movement in the spatial view 420 (e.g., via arrow keys or any other support user inputs). The environment view construction engine 112 may then navigate the spatial view 420 by receiving a movement direction (e.g., via user input) and progressing from a current environment image depicted for the spatial view 420 to a next environment image based on the movement direction. In progressing from the current environment image to the next environment, the environment view construction engine 112 may determine the next environment image from among the environment images that form the spatial view 420 as the particular environment image that is closest in position to the current environment image along the movement direction.

In any such ways, the environment view construction engine 112 may support visualization of an environment through a spatial view 420 as well as navigation through the spatial view 420 via user commands. As the spatial view 420 is constructed from environment images 410 provided by a client device, a user (e.g., remote technician) can navigate the spatial view 420 independent of a current location or use of a client device that captured, selectively determined, and transmitted the environment images 410 used to form the spatial view 420. Moreover, client device-independent navigation of the spatial view 420 of an environment means that a local operator need not be instructed to position the client device at a specific location or orientation for a remote user to view. Instead, the remote user may themselves navigate to a particular environment portion in the spatial view 420 constructed for the environment, doing so by progressing to a specific environment image that depicts the particular environment portion.

In addition or as an alternative to spatial views, the environment view construction engine 112 may construct temporal views of an environment. For instance, the environment view construction engine 112 may sort the environment images 410 into different temporal sets based on a timestamp value of each of the environment images. As an example, such temporal sets may be sorted by environment view construction engine 112 in time range intervals (e.g., non-overlapping 10 second ranges or any other configurable time range), and such sorting may based on the timestamp values for the environment images 410. The environment view construction engine 112 may construct different spatial views for each of the temporal sets, doing so based on the specific environment images sorted into each respective temporal set. In the example shown in FIG. 4, the environment view construction engine 112 constructs the temporal sets 421, 422, and 423, each of which may include a distinct subset of the environment images 410 transmitted from a client device.

Through the temporal sets 421, 422, and 423, the environment view construction engine 112 may support temporal navigation of an environment. For instance, the environment view construction engine 112 may support visualization of a particular location, pose, orientation, position, or portion of an environment across different time periods associated with the temporal sets 421, 422, and 423 (and more). As the environment view construction engine 112 may depict one environment image at a time to visualize an environment, navigation of the depicted view of an environment can be supported along a time axis by which the environment view construction engine 112 navigates backwards or forward in time intervals at the particular location of an environment by traversing across temporal sets and accessing the relevant environment image of a given temporal set for the particular location.

Through any of the ways described herein, the environment view construction engine 112 may support construction of environment views from received environment images 410, including multiple spatial views sorted into different temporal sets. The environment construction technology feature presented herein may also support navigation of the constructed environment views, both spatially and temporarily. Through such construction and navigation features, the environment construction technology described herein may provide a robust, efficient, and flexible mechanism by which a user remote from an environment can nonetheless view and assess underlying portions of the environment.

Figure 5:
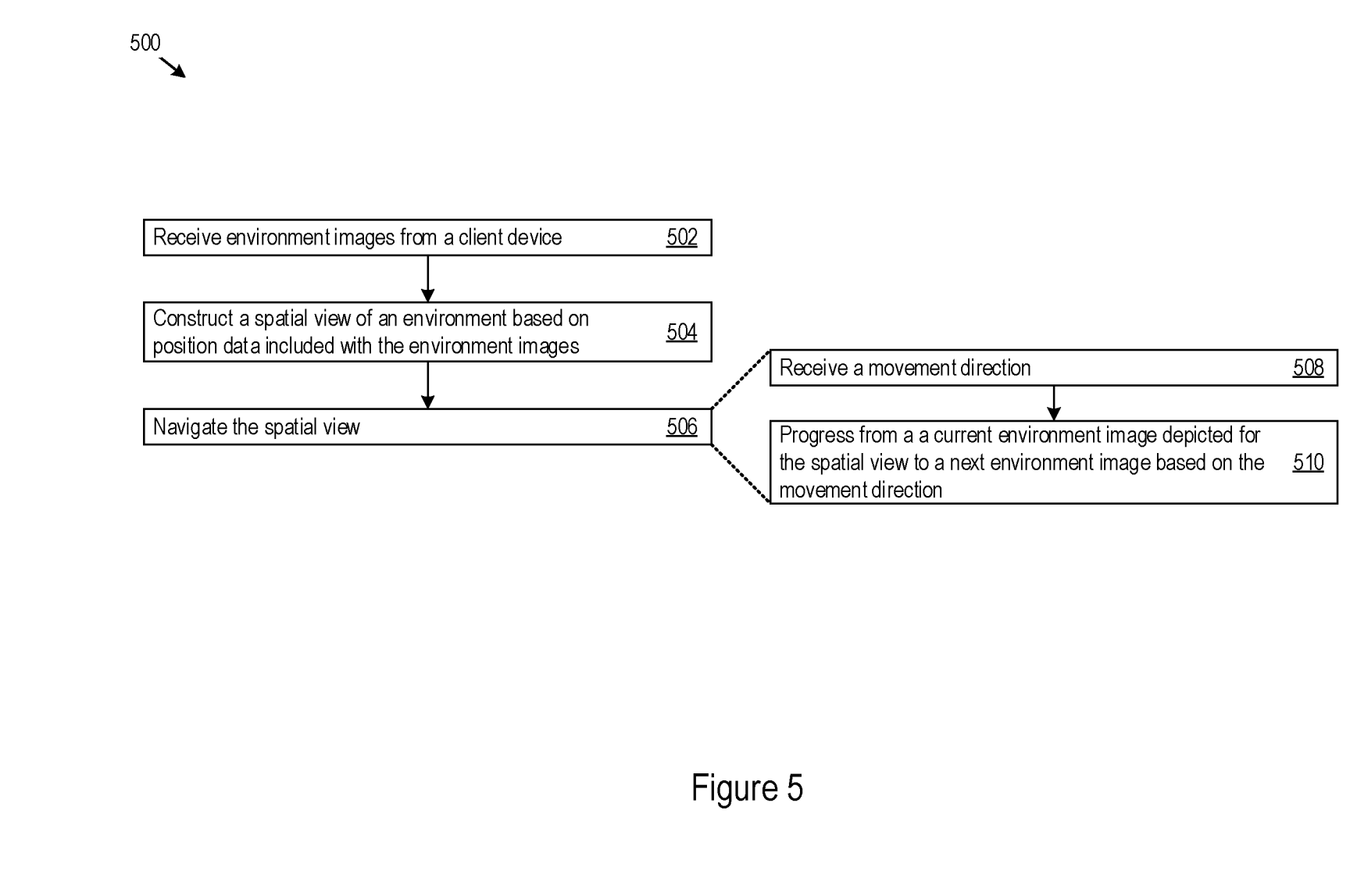
FIG. 5 shows an example of logic that a computing system may implement to construct environment views from transmitted environment images.

FIG. 5 shows an example of logic 500 that a computing system may implement to construct environment views from transmitted environment images. For example, the computing system 100 may implement the logic 500 as hardware, executable instructions stored on a machine-readable medium, or as a combination of both. A server 104 of the computing system 100 may implement the logic 500 via the environment view construction engine 112, through which the computing system 100 may perform or execute the logic 500 as a method to support environment view constructions from received environment images. The following description of the logic 500 is provided using the environment view construction engine 112 as an example. However, various other implementation options by systems are possible.

In implementing the logic 500, the environment view construction engine 112 may receive environment images from a client device (502) and constructed a spatial view of an environment based on position data included with the environment images (504). In implementing the logic 500, the environment view construction engine 112 may also navigate the spatial view (506), including by receiving a movement direction (508) and progressing from a current environment image depicted for the spatial view to a next environment image based on the movement direction (510).

The logic 500 shown in FIG. 5 provides an illustrative example by which a server 104 may support construction of environment views according to the present disclosure. Additional or alternative steps in the logic 500 are contemplated herein, including according to any of the various features described herein for the client device 102, environment capture engine 110, server 104, environment view construction engine 112, and any combinations thereof.

Figure 6:
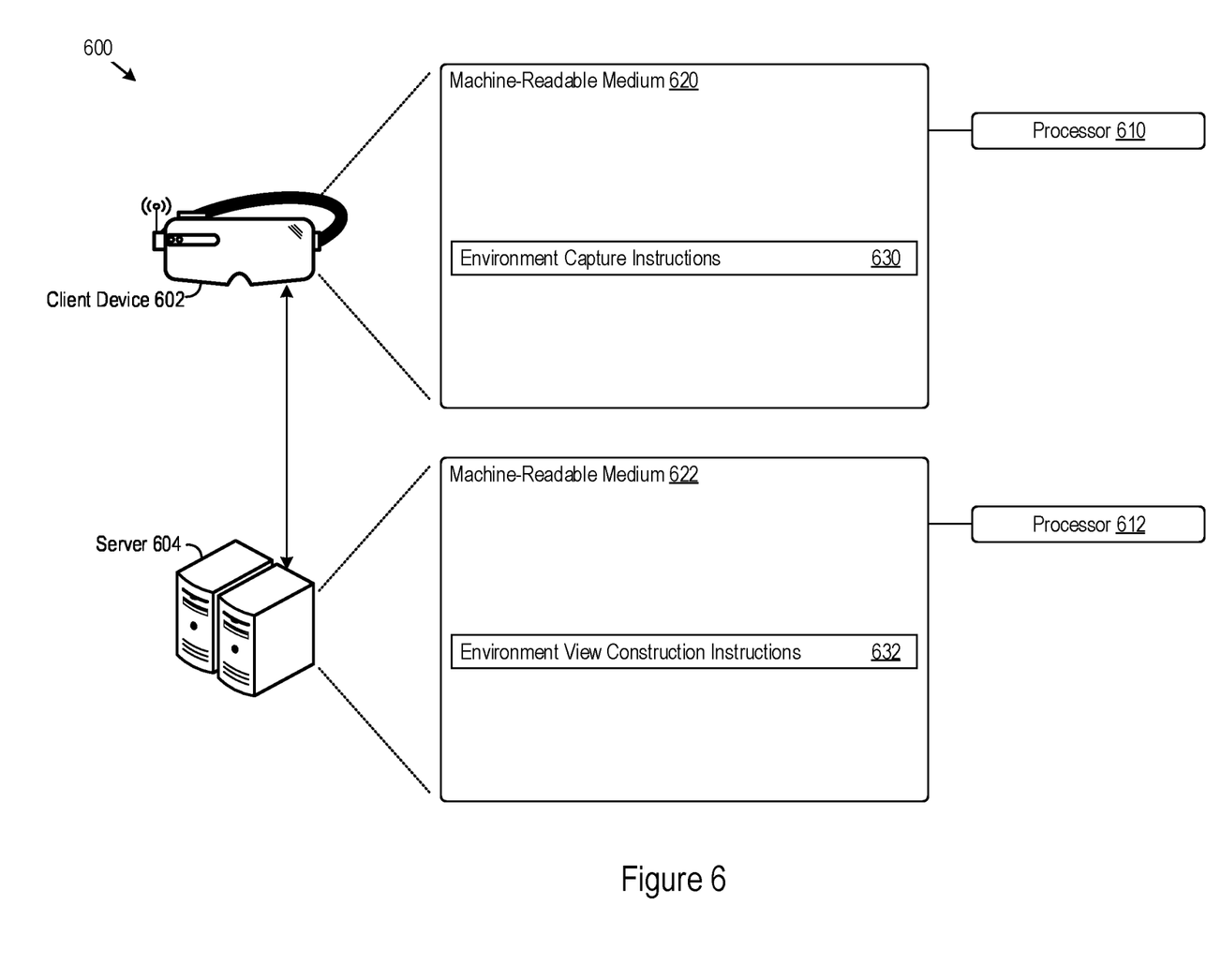
FIG. 6 shows an example of a computing system that supports construction of environment views from selectively determined environment images.

FIG. 6 shows an example of a computing system 600 that supports construction of environment views from selectively determined environment images. The computing system 600 may be a distributed system that includes different components located at different geographic locations. For instance, the computing system 600 may include a client device 102 and a server 104, which may be separate physical and logical entities in the computing system 600 that include separate hardware, such as processors and memory. The client device 602 and server 604 may share any of the characteristics and features as described herein for the client device 102 and server 104.

The client device 602 may include a processor 610 and the server 604 may include a processor 612, either or both of which may take the form of a single or multiple processors. The processors 610 and 612 may respectively include a central processing unit (CPU), microprocessor, or any hardware device suitable for executing instructions stored on a machine-readable medium. The client device 602 and server 604 of the computing system 600 may each include machine-readable medium, such as the machine-readable medium 620 of the client device 602 and the machine-readable medium 622 of the server 604. The machine-readable mediums 620 and 622 may take the form of any non-transitory electronic, magnetic, optical, or other physical storage device that stores executable instructions, such as the environment capture instructions 630 stored on the client device 602 and the environment view construction instructions 632 stored in the server 604 of FIG. 6. As such, the machine-readable medium 620 and 622 may be, for example, Random Access Memory (RAM) such as a dynamic RAM (DRAM), flash memory, spin-transfer torque memory, an Electrically-Erasable Programmable Read-Only Memory (EEPROM), a storage drive, an optical disk, and the like.

The computing system 600 may execute instructions stored on the machine-readable mediums 620 and 622 through the processors 610 and 612. Executing the instructions (e.g., the environment capture instructions 630 and/or the environment view construction instructions 632) may cause the computing system 600 to perform any of the environment construction features described herein, including according to any of the features of the environment capture engine 110, the environment view construction engine 112, or combinations of both.

For example, execution of the environment capture instructions 630 by the processor 610 may cause the client device 602 to access a stream of image frames captured by the client device 602 (the image frames depicting an environment), determine, from the stream of image frames, environment images that satisfy selection criteria, and transmit the environment images to the server 604. Execution of the environment view construction instructions 632 by the processor 612 of the server 604 may cause the server 604 to receive environment images from the client device 602, construct a spatial view of the environment based on position data included with the environment images, and navigate the spatial view, including by receiving a movement direction and progressing from a current environment image depicted for the spatial view to a next environment image based on the movement direction.

Any additional or alternative environment construction features as described herein may be implemented via the environment capture instructions 630, environment view construction instructions 632, or a combination of both.

The systems, methods, devices, and logic described above, including client devices, servers, the environment capture engine 110, and the environment view construction engine 112, may be implemented in many different ways in many different combinations of hardware, logic, circuitry, and executable instructions stored on a machine-readable medium. For example, the environment capture engine 110, the environment view construction engine 112, or combinations thereof, may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. A product, such as a computer program product, may include a storage medium and machine-readable instructions stored on the medium, which when executed in an endpoint, computer system, or other device, cause the device to perform operations according to any of the description above, including according to any features of the environment capture engine 110, the environment view construction engine 112, or combinations thereof.

The processing capability of the systems, devices, and engines described herein, including client devices, servers, the environment capture engine 110, and the environment view construction engine 112, may be distributed among multiple system components, such as among multiple processors and memories, optionally including multiple distributed processing systems or cloud/network elements. Parameters, databases, and other data structures may be separately stored and managed, may be incorporated into a single memory or database, may be logically and physically organized in many different ways, and may be implemented in many ways, including data structures such as linked lists, hash tables, or implicit storage mechanisms. Programs may be parts (e.g., subroutines) of a single program, separate programs, distributed across several memories and processors, or implemented in many different ways, such as in a library (e.g., a shared library).

While various examples have been described above, many more implementations are possible.

The invention claimed is:

1. A method comprising:
 by a computing system:
   receiving environment images from a client device, wherein the environment images depict an environment and are selectively transmitted from the client device based on selection criteria applied by the client device, wherein the selection criteria comprise:
     a frequency criterion that specifies transmission of environment images at a rate lower than a threshold frequency;
     a blur criterion that specifies a threshold image quality the environment images must satisfy; and
     a difference criterion that specifies that content of a given environment image must differ from content of a previously determined environment image by a threshold degree, and
     wherein each of the environment images satisfy each of the selection criteria;
   constructing a spatial view of the environment based on position data included with the environment images; and
   navigating the spatial view, including by:
     receiving a movement direction; and
     progressing from a current environment image depicted for the spatial view to a next environment image based on the movement direction.

2. The method of claim 1, comprising:
 sorting the environment images into different temporal sets based on a timestamp value of each of the environment images; and
 constructing a separate spatial view for each of the different temporal sets, including the spatial view for a particular temporal set of the different temporal sets, with the environment images sorted into each of the different temporal sets.

3. The method of claim 1, wherein progressing from the current environment image to the next environment comprises determining the next environment image from among the environment images in the spatial view that is closest in position to the current environment image along the movement direction.

4. The method of claim 1, comprising constructing the spatial view of the environment without stitching any of the environment images together.

5. The method of claim 1, wherein the environment images are selectively transmitted by the client device based on the selection criteria applied to video frames of a video stream captured by the client device.

6. A system comprising:
 a client device comprising an environment capture engine configured to:
   access a stream of image frames captured by the client device, the image frames depicting an environment;
   determine, from the stream of image frames, environment images that satisfy selection criteria, wherein the selection criteria comprise:
     a frequency criterion that specifies transmission of environment images at a rate lower than a threshold frequency;
     a blur criterion that specifies a threshold image quality the environment images must satisfy; and
     a difference criterion that specifies that content of a given environment image must differ from content of a previously determined environment image by a threshold degree,
     wherein each of the determined environment images satisfy each of the selection criteria; and
   transmit the environment images; and
 a server comprising an environment view engine configured to:
   receive the environment images from the client device;
   construct a spatial view of the environment based on position data included with the environment images; and
   navigate the spatial view, including by:
     receiving a movement direction; and
     progressing from a current environment image depicted for the spatial view to a next environment image based on the movement direction.

7. The system of claim 6, wherein the environment view engine is configured to:
 sort the environment images into different temporal sets based on a timestamp value of each of the environment images; and
 construct a separate spatial view for each of the different temporal sets, including the spatial view for a particular temporal set of the different temporal sets, with the environment images sorted into each of the different temporal sets.

8. The system of claim 6, wherein the environment view engine is configured to progress from the current environment image to the next environment by determining the next environment image from among the environment images in the spatial view that is closest in position to the current environment image along the movement direction.

9. The system of claim 6, wherein the environment view engine is configured to construct the spatial view of the environment without stitching any of the environment images together.

10. A non-transitory machine-readable medium comprising instructions that, when executed by a processor, cause a computing system to:

receive environment images from a client device, wherein the environment images depict an environment and are selectively determined by the client device based on selection criteria applied by the client device, wherein the selection criteria comprise:
- a frequency criterion that specifies transmission of environment images at a rate lower than a threshold frequency;
- a blur criterion that specifies a threshold image quality the environment images must satisfy; and
- a difference criterion that specifies that content of a given environment image must differ from content of a previously determined environment image by a threshold degree, and
wherein each of the environment images satisfy each of the selection criteria;
construct a spatial view of the environment based on position data included with the environment images; and
navigate the spatial view, including by:
- receiving a movement direction; and
- progressing from a current environment image depicted for the spatial view to a next environment image based on the movement direction.

11. The non-transitory machine-readable medium of claim 10, wherein the instructions cause the computing system to:
- sort the environment images into different temporal sets based on a timestamp value of each of the environment images; and
- construct a separate spatial view for each of the different temporal sets, including the spatial view for a particular temporal set of the different temporal sets, with the environment images sorted into each of the different temporal sets.

12. The non-transitory machine-readable medium of claim 10, wherein the instructions cause the computing system to progress from the current environment image to the next environment by determining the next environment image from among the environment images in the spatial view that is closest in position to the current environment image along the movement direction.

13. The non-transitory machine-readable medium of claim 10, wherein the instructions cause the computing system to construct the spatial view of the environment without stitching any of the environment images together.

* * * * *